May 25, 1937. C. KRITZLER ET AL 2,081,749
PISTON AND ROD CONNECTION
Filed Aug. 28, 1936
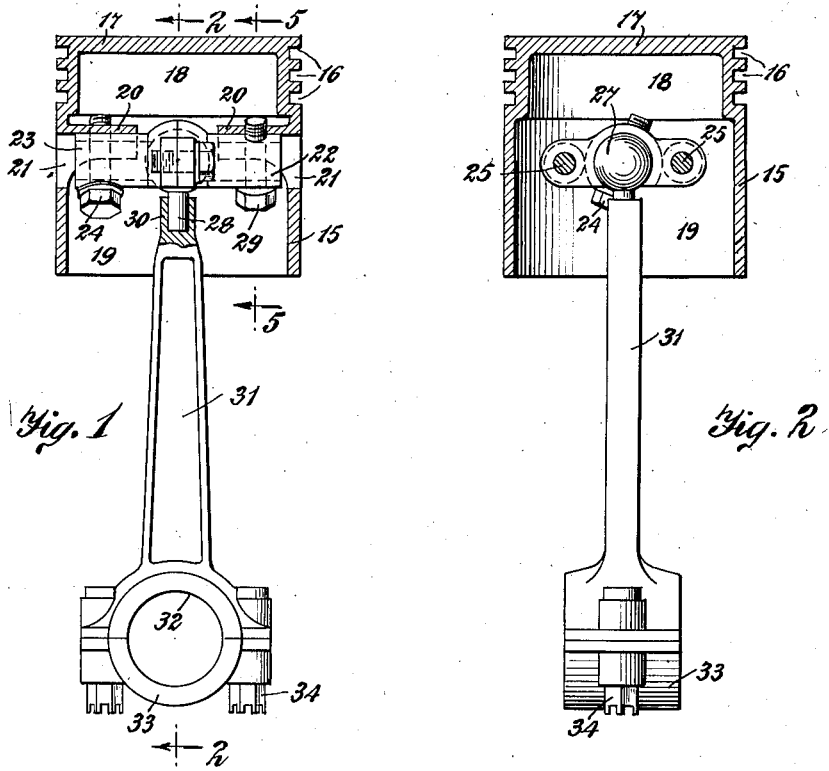
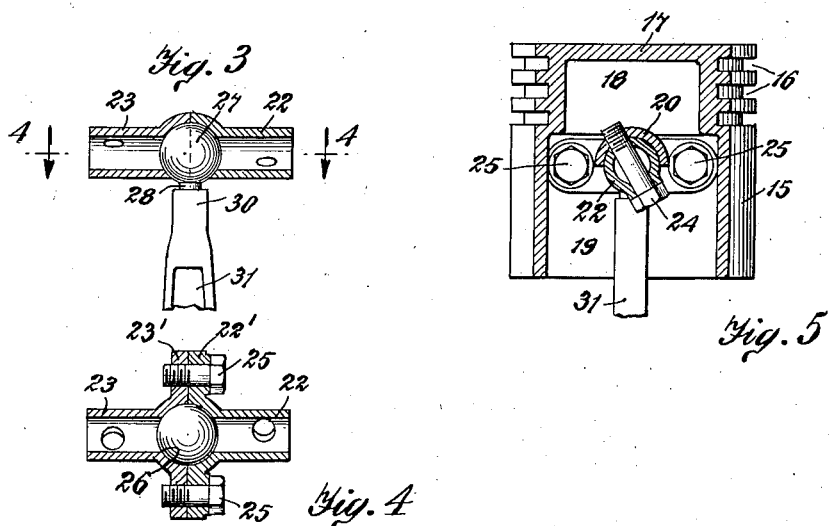
INVENTORS
CARL KRITZLER AND
CHARLES RAGGENBASS
BY
ATTORNEY.

Patented May 25, 1937

2,081,749

UNITED STATES PATENT OFFICE 2,081,749

PISTON AND ROD CONNECTION

Carl Kritzler and Charles Raggenbass,
New York, N. Y.

Application August 28, 1936, Serial No. 98,304

1 Claim. (Cl. 309—16)

This invention relates to improvements in engines and motors of the reciprocating type and more particularly to connections between their pistons and piston rods, and in which no cross heads are used, the piston rods directly connecting with the cranks of the crank shafts.

An object of the invention is to provide a connection between the piston and piston rod that contains a universal joint whereby the necessity of extremely accurate alinement is rendered unnecessary.

A further feature is in the provision of means whereby the joint connection may be adjusted for wear which is certain to occur.

Another purpose is to produce a joint simple to construct, smooth in operation and readily substituted for such as are in common use.

These several advantageous objects are attained by the novel construction and combination of parts hereinafter described and illustrated in the annexed drawing, forming a material component of this disclosure, and in which:—

Figure 1 is a side elevational view of an embodiment of the invention, parts being in section to show the construction.

Figure 2 is a similar front view of the same, the section being taken on line 2—2 of Figure 1.

Figure 3 is a fragmentary sectional view showing the connecting joint in detail.

Figure 4 is a sectional view taken on line 4—4 of Figure 3.

Figure 5 is a sectional view taken on line 5—5 of Figure 1.

Referring in further detail to the drawing, the numeral 15 designates in general a common type of piston provided with annular grooves 16 in which to insert packing rings, and having a closed integral outer end or head 17.

Within the piston is a chamber 18 adjacent the head while therebelow, is a larger chamber 19 open at its lower end.

Extending into the chamber 19, from opposite sides, midway the length of the piston, are alined bosses 20, semi-cylindrical in cross-section, their inner concave surfaces registering with openings 21 in the wall of the piston.

A pair of opposed clamp jaws 22—23, respectively right and left, have their tubular outer ends fitted to seat in the concave bosses 20 and are held rigidly therein by screws 24 disposed at divergent angles and entering the bosses.

The inner adjacent ends of the clamp jaws are bulged outwardly, in the direction of the closed end of the piston, and are further formed with opposed projecting lugs 22'—23' faced and held together by bolts 25.

A substantially spherical seat 26 is formed at the junction of the clamp jaw, to receive a ball 27 having a stem 28 that projects through an opening opposite the seat 26 and engages in a socket 30 provided axially in the end of a connecting rod 31.

The opposite end of the connecting rod is shaped to present a bearing 32 for the crank of a shaft, held in place by a cap 33 secured by screws 34.

It will now be apparent that when wear occurs between the surface of the ball 27 and its seat, the flanged lugs 22'—23' can be easily dressed to refit the ball to its seat.

It is also apparent that any minor twist or misalinement of the piston relative to the shaft is compensated by reason of the ball-and-socket joint thus provided.

Although the foregoing is descriptive of the preferred embodiment of the invention, it will be apparent that minor changes may be made in its construction, without the exercise of invention or conflicting with the scope of the claim hereto appended.

Having thus described the invention, what is claimed as new and desired to secure by Letters Patent, is:—

A piston and rod connection including a pair of lugs extending inwardly from opposite sides of said piston, said lugs having outwardly facing concave seats, a clamp element on said seats to act as a bridge therebetween, screws set at divergent angles to rigidly fix said clamp element on said seats, a spherical seat in said clamp element, a ball fitted to the last named seat, and a plain cylindrical stem extending from said ball through said seat to engage the rod connection.

CARL KRITZLER.
CHARLES RAGGENBASS.